United States Patent
Kahabka et al.

(10) Patent No.: US 11,061,391 B2
(45) Date of Patent: Jul. 13, 2021

(54) AUTOMATION SYSTEM AND METHOD FOR ERROR-PROTECTED ACQUISITION OF A MEASURED VALUE

(71) Applicant: Siemens Aktiengesellschaft, Munich (DE)

(72) Inventors: Thomas Kahabka, Hersbruck (DE); Johannes Mueller, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 400 days.

(21) Appl. No.: 16/207,868

(22) Filed: Dec. 3, 2018

(65) Prior Publication Data
US 2019/0171197 A1 Jun. 6, 2019

(30) Foreign Application Priority Data
Dec. 4, 2017 (EP) .................................. 17205168

(51) Int. Cl.
*G05B 23/02* (2006.01)
*G01D 9/00* (2006.01)
(Continued)

(52) U.S. Cl.
CPC ......... *G05B 23/0256* (2013.01); *G01D 9/005* (2013.01); *G05B 9/03* (2013.01);
(Continued)

(58) Field of Classification Search
CPC .. G05B 23/0256; G05B 23/0237; G05B 9/03; G05B 19/0428; G05B 19/058;
(Continued)

(56) References Cited

U.S. PATENT DOCUMENTS

| 6,778,867 B1* | 8/2004 | Ziegler | ................. B25J 9/1674 318/563 |
| 2004/0065533 A1* | 4/2004 | Schwesig | ............... H01H 9/167 200/410 |

(Continued)

FOREIGN PATENT DOCUMENTS

| DE | 10235502 | 12/2010 |
| WO | WO2005/109132 | 11/2005 |

OTHER PUBLICATIONS

Frederickson Anton A: "Fault Tolerant Programmable Controllers for Safety Systems"; USA, ISA Transactions, Instrument Society of America, Pittsburgh, US, vol. 29, No. 2, pp. 13-16, XP000114560, ISSN: 0019-0578, p. 13, col. 1—p. 14, col. 1, line 22, fig. 1a; DOI: Sachgebiete (IPC)10.1016/0019-0578(90)90059-TG05B, the whole Document; 1990.

*Primary Examiner* — Raymond L Nimox
(74) *Attorney, Agent, or Firm* — Cozen O'Connor (57) ABSTRACT

A method for error-protected acquisition of a measured value in a control unit, wherein the measured value is firstly acquired with a first acquisition device and secondly with a second acquisition device and thereby a first measured value and a second measured value are made available, where in a comparison step in a safety program executing in the control unit, the first and the second measured value are compared with one another for a deviation from one another and upon reaching or exceeding a pre-determined maximum deviation, an error is identified.

14 Claims, 6 Drawing Sheets

(51) Int. Cl.
*G05B 19/042* (2006.01)
*G05B 19/05* (2006.01)
*G05B 9/03* (2006.01)

(52) U.S. Cl.
CPC ....... *G05B 19/0428* (2013.01); *G05B 19/058* (2013.01); *G05B 23/0237* (2013.01); *G05B 2219/1187* (2013.01); *G05B 2219/24184* (2013.01); *G05B 2219/24196* (2013.01)

(58) Field of Classification Search
CPC .. G05B 2219/1187; G05B 2219/24184; G05B 2219/24196; G01D 9/005
See application file for complete search history.

(56) References Cited

U.S. PATENT DOCUMENTS

| | | | |
|---|---|---|---|
| 2008/0190166 A1* | 8/2008 | Hahn | G05B 19/406 73/1.01 |
| 2009/0072986 A1* | 3/2009 | Bussert | G05B 9/03 340/679 |
| 2009/0125760 A1* | 5/2009 | Schlette | G06F 11/0796 714/718 |
| 2009/0198353 A1* | 8/2009 | Horn | G05B 19/0423 700/86 |
| 2013/0197849 A1* | 8/2013 | Moiseev | G05B 23/0227 702/116 |
| 2014/0058543 A1* | 2/2014 | Gerding | G05B 19/0425 700/83 |
| 2015/0088286 A1* | 3/2015 | Ruth | G05B 19/0426 700/86 |

\* cited by examiner

AUTOMATION SYSTEM AND METHOD FOR ERROR-PROTECTED ACQUISITION OF A MEASURED VALUE

BACKGROUND OF THE INVENTION

1. Field of the Invention

The invention relates to a method for error-protected acquisition of a measured value in a control unit, where the measured value is firstly acquired with a first acquisition device and is secondly acquired with a second acquisition device and thereby a first measured value and a second measured value are made available, where in a comparison step in a safety program executing in the control unit, the first and the second measured value are compared with one another for a deviation from one another and on reaching or exceeding a pre-determined maximum deviation, an error is identified.

2. Description of the Related Art

WO 2005/109132 A1 discloses a conventional method for error-protected acquisition of a measured value.

In industrial automation technology, for monitoring safety-relevant process values (e.g., pressure, or speed) these values are read in and processed by functionally reliable systems. A functional safety is ensured in the field of engineering by complying with the International Organization for Standardization (ISO) standard 13849-1 and -2 and International Electro Technical Commission (IEC) standard 62061.

In the context of the invention, functional safety is understood according to the definition under the standard EN/IEC 61511: "Functional safety—safety instrumented systems for the process industry sector" and EN/IEC 61508: "Functional safety of electrical/electronic/programmable electronic safety-related systems".

Error-protected signal assemblies from Siemens exist for the automation system S7 300 and the decentralized peripheral device ET 200M. Assemblies of this type typically fulfill the requirements and criteria of IEC 61131, part 2. Approvals for such assemblies for CSA, UL and FM also exist. Typically the assemblies are certified, for example by a TUV (German Technical Inspection Association), for use in safety operating modes up to the safety class SIL (Safety Integrity Level) 3 according to IEC 61508: 2000 or according to the performance level (PL) E and category 4 under ISO 13849-1: 2006 or EN ISO 138491: 2008.

Thus, for the solution with the ET 200M assemblies, there is a certified hardware solution, but these assemblies have a relatively large structural form that cannot be installed in all machines. A solution for a smaller system, for example, assemblies in the ET 200S series does not exist.

For an acquisition of, for example, safe analog values, in particular a current acquisition from 4 to 20 mA based on the Siemens SIMATIC assemblies ET200S or ET200SP, there has so far been no solution. Although, naturally, non-safe analog values can be read in with these assemblies, no certification or approval for the reading in of safe values has been issued.

SUMMARY OF THE INVENTION

In view of the foregoing, it is an object of the invention to provide a solution for error-protected acquisition of measured values with standard assemblies (such as ET200S or ET200SP), in particular with assemblies not designed for functional error-protected operation.

This and other objects and advantages are achieved in accordance with the invention by a method for error-protected acquisition of a measured value, where a first acquisition device is parameterized for a first measurement range that is to be set, a second acquisition device is parameterized for a second measurement range that is to be set, where with the aid of a safety program, the measurement range for the second acquisition device is re-parameterized alternatingly and herein in the safety program, based on the information regarding how the second acquisition device is currently parameterized and thus the currently set second measurement range is known and it is therefore known in which range the second measured value must lie, a plausibility check is performed between the first measured value and the second measured value, where given a negative plausibility check result, an error is identified.

In the context of the invention, a safety program is to be understood as being a piece of software or an industrial control program that monitors analog values in the error-protected part of a control unit (CPU). With the aid of the aforementioned diversely set parameterization, it is possible to recognize different error models included in an FMEA. In a system design of the hardware, the system is subjected to an intensive failure modes and effects analysis (FMEA). Herein, with the system and its components, inter alia, defined error models according to DIN 61784-3 are investigated (e.g., distortion, unintended repetition, or erroneous sequence).

With the first and second acquisition devices wherein the acquisition devices are configured, for example, as analog input assemblies, it is possible to enable redundant acquisition devices of, for example, two analog values and to feed these to the safety program (F-program) and to check whether they are identical. With this, different error models that are described in the FMEA can be covered and brought under control. If the two values diverge too far or even differ entirely, a corresponding error action is instigated.

Advantageously, it is possible with this different parameterization that via the first value, an expectation can be placed on the second value in the safety program.

In a further embodiment of the method, analog-digital converters are used in the acquisition means, where the analog-digital converter in the first acquisition device for the first measured value provides a first integer value and the analog-digital converter in the second acquisition device for the second measured value provides a second integer value to which values the plausibility check is applied.

If, for example, the acquisition devices is configured such that it can acquire a current in the range from 0 to 20 mA or in the range from 4 to 20 mA, it is advantageous if during a measurement of a current of, for example 4 mA, an integer value of zero is generated with the first acquisition device and based on, as is known in the safety program, how the second acquisition device must now behave at 4 mA, an expectation can be placed on the second measured value. The second measured value must thus be situated in a region of approximately 5530 as an integer value, otherwise an error has occurred that is revealed by a cross-comparison.

In a further embodiment, in the safety program, i.e., in the automation program configured for functional safety, of the control unit, the plausibility check is performed in a first functional component and the re-parameterization of the second acquisition device is performed in a second functional component, the first and second measured value are transferred to the first functional component as input values and, as output values, firstly the error-protected measured value is provided and secondly a start signal is provided for the re-parameterization, where the start signal is provided as an input value to the second functional component, which thereupon initiates the re-parameterization and following successful re-parameterization, the second functional component provides a feedback signal, which is then switched to the first functional component as an input value.

Summarizing, it can be stated in relation to the method steps that a sequence for the protection of the analog values is performed as follows.

1. Reading in the two analog values (redundancy), where the analog values are necessarily not identical because an assembly is parameterized, for example, in the range from 4 to 20 mA and the other assembly is parameterized in the range from 0 to 20 mA.

2. Plausibility checking of the two analog values in the safety program through different measures (such as cross-comparison, or timeout).

3. Outputs from the first functional component write: a) output of a safe analog value or b) output of a replacement value, a diagnosis word or an error bit.

4. Setting of a start flag (start signal) for triggering the reparameterization process.

5. Renewed start at 1. as soon as the reparameterization has completed successfully.

The safety function is sustained through different measures and implemented methods realized in the safety program. The individual measures are considered below.

It is one of the different measures, for example, if in the first functional component, it is additionally monitored whether at least one measured value changes in a pre-determined time window and, if no change occurs, an error is also identified. This measure in the safety program constitutes a monitoring for a "stuck-at error" or a frozen state. Herein, in each cycle, the safety program stores the current value of the analog values and compares it in the next cycle with the current value there. The same is done for the second analog value. Given that the analog value is identical within two cycles, a timer is started. Within this time (the "freeze time"), the old values must differ from the current values. If this is not the case, the relevant error action is initiated.

In the comparisons of the values, a comparison with the normalized values dependent upon the parameterization is naturally performed.

It is also an object of the invention to provide an automation system. The automation system is configured for error-protected acquisition of a measured value. In the context of the invention and in relation to the error-protected measured value and the error-protected acquisition, reference is made again here to the functional safety defined in the standard.

The automation system in accordance with the invention is configured for error-protected acquisition of a measured value and comprises a control unit, a first acquisition device configured to acquire a first measured value, a second acquisition device configured to acquire a second measured value, a safety program running in the control unit that is configured to compare the first and second measured values with one another for a deviation from one another and on reaching or exceeding a pre-determined maximum deviation, to identify an error, where the first acquisition device is set for a first measurement range to be set and the second acquisition device is alternatingly re-parameterizable with the aid of the safety program in a second measurement range to be set, where the safety program thus has knowledge regarding the currently set second measurement range, furthermore the safety program is configured to perform a plausibility check between the first measured value and the second measured value, and where the safety program is configured to perform the plausibility check with the aid of the knowledge of the value range to be expected within which the second measured value must lie and is further configured, in the event of a negative plausibility check result, to signal an error. An automation system for error-protected acquisition of a measured value concerns an automation system that is configured for functional safety. The safety program is also a safety program that is configured to comply with the functional safety requirements.

In the automation system in accordance with the invention, it is assumed that for the control unit, a control unit configured for functional safety is used and for the acquisition of the measured values with the acquisition devices, standard assemblies are used, specifically assemblies that are not configured for functional safety and do not have a corresponding certification.

In a further embodiment of the automation system, the acquisition devices have an analog-digital converter and the analog-digital in the first acquisition device for the first measurement range provides a first integer value and the analog-digital converter in the second acquisition device for the second measured value provides a second integer value and the safety program is configured to perform the plausibility check based on the integer values.

The safety program, in particular the safety program configured for functional safety of the control unit, advantageously comprises a first functional component that is configured to perform the plausibility check and a second functional component that is configured to perform the re-parameterization of the second acquisition devices.

The control unit comprises an industrial automation control system configured for functional safety and the first acquisition device and the second acquisition device are respectively configured as an industrial analog assembly. It should be noted that it is only possible, using standard assemblies, to acquire a measured value according to the criteria of functional safety with the aid of the invention.

Safety is further fulfilled if additionally an industrial assembly configured for functional safety is connected to a backplane bus to which the industrial analog assembly is also connected, such that monitoring of the backplane bus configured for functional safety is realized where the industrial assembly designed for functional safety is configured to generate a quality signal that permits conclusions regarding errors in the backplane bus.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The drawings show an exemplary embodiment, in which.

DETAILED DESCRIPTION OF THE EXEMPLARY EMBODIMENTS

Figure 1:
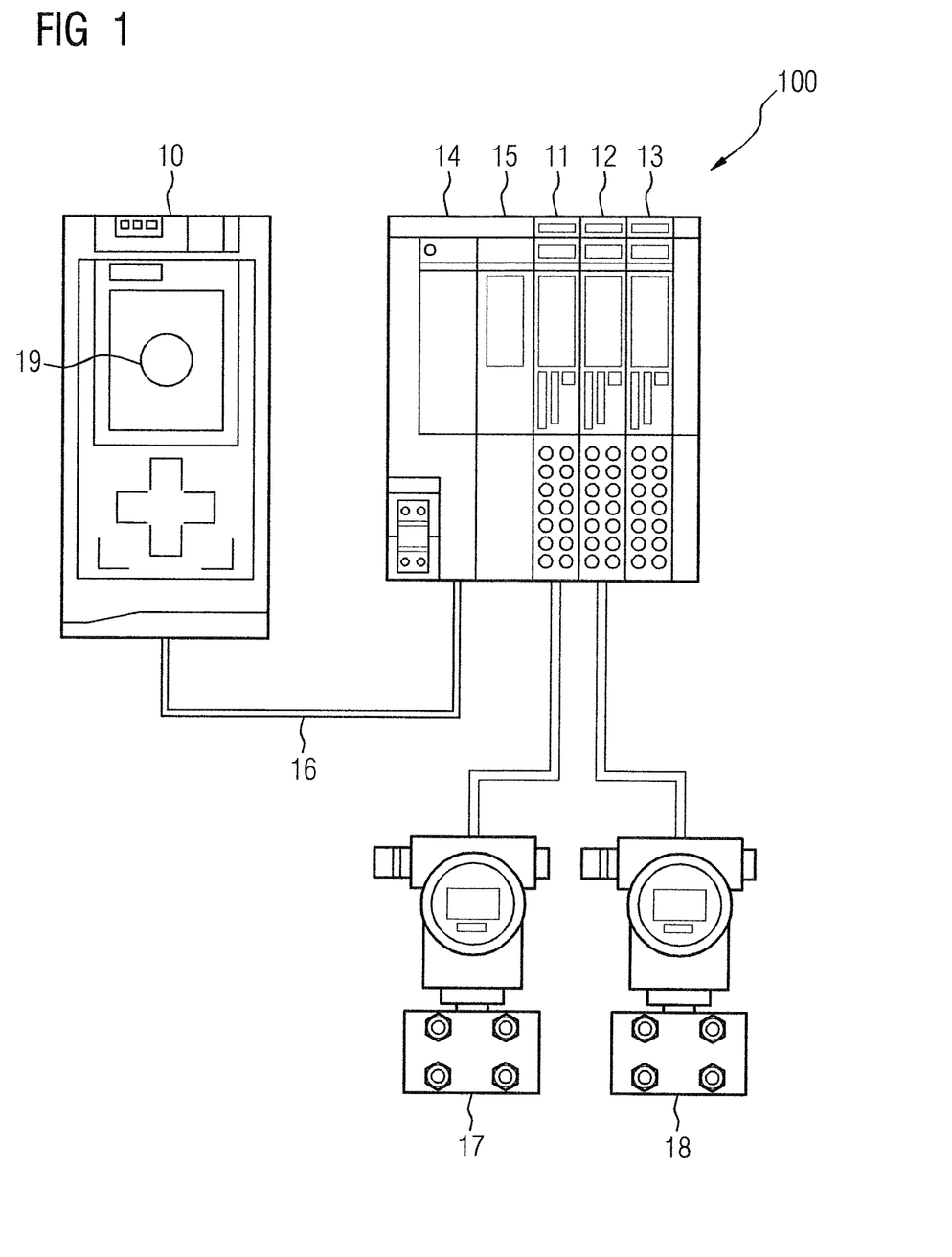
FIG. 1 is a hardware structure of the automation system in accordance with the invention.

FIG. 1 shows an automation system 100 with a control unit (F-CPU) and a de-centrally arranged assembly arrangement that comprises a first acquisition device 11 (standard assembly), a second acquisition device 12 (standard assembly), an additional industrial assembly 13 (F-assembly) configured for functional safety, an interface module 14 and a server module 15.

For redundant acquisition of a measured value, the first acquisition device 11 is connected to a first measuring transducer 17 and the second acquisition device 12 is connected to a second measuring transducer 18. The two measuring transducers 17, 18 each acquire the same physical process variable. The decentralized assembly periphery system with the assemblies 11, 12, 13, 14, 15 is mechanically arranged in a backplane bus system.

The control unit 10 is connected via a field bus 16, for example, with PROFI-Safe technology such that this field bus 16 is also configured for functional safety, to the interface module 14. A safety program 19 runs in the control unit 10.

Figure 2:
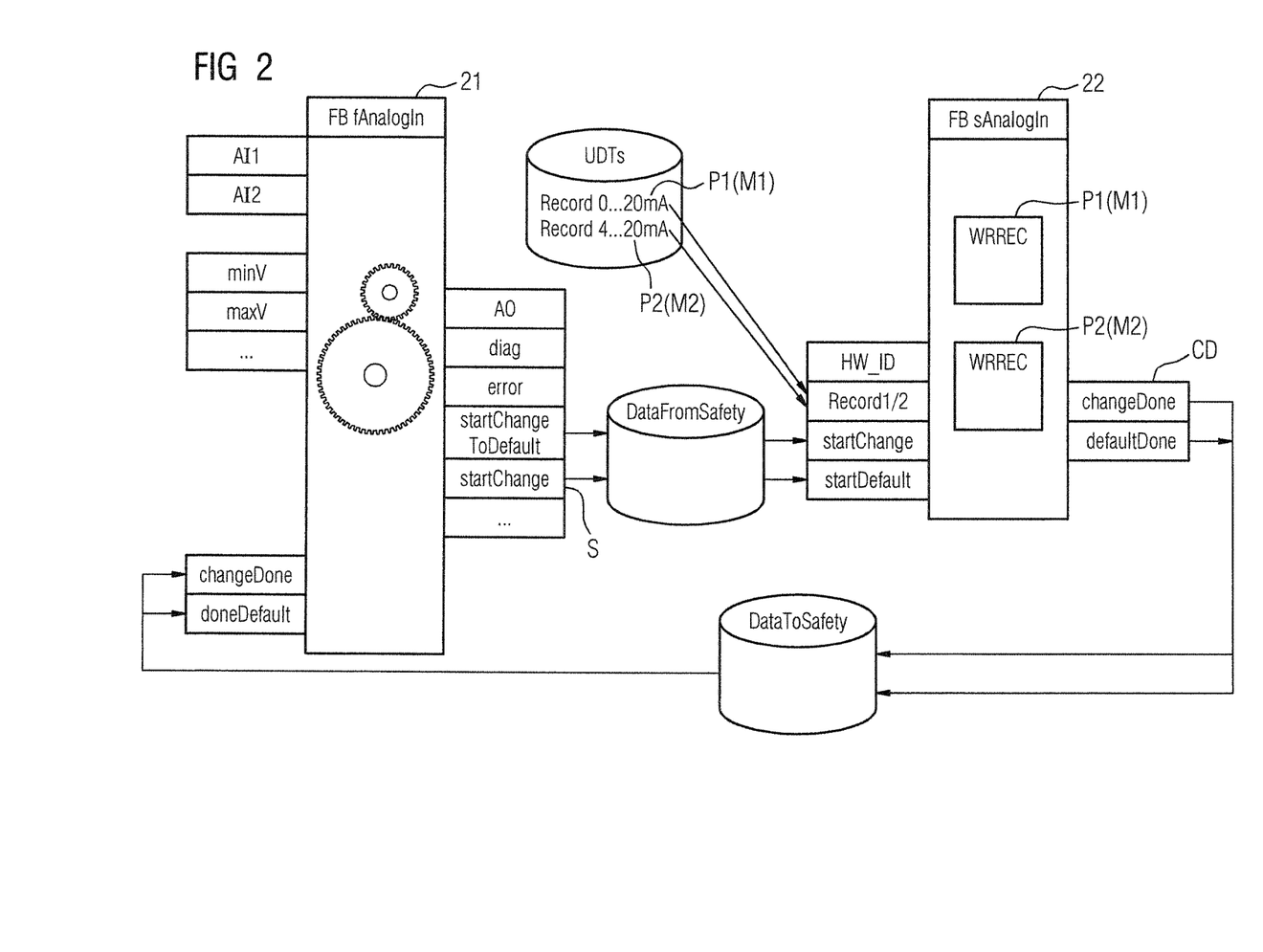
FIG. 2 is a concept of the functional components used, for example in an engineering system in accordance with the invention.

In FIG. 2, the concept and the interconnection of the first functional component 21 and of the second functional component 22 are shown. The functional components 21, 22 run in the safety program 19 of the control unit 10. The first functional component 21 is configured perform out the plausibility check. The second functional component 22 is configured to perform a re-parameterization of the second acquisition device 12. In accordance with the method, the functional components 21, 22 are therefore configured, with the aid of the safety program, to re-parameterize a measurement range M2 for the second acquisition device 12 alternatingly and herein in the safety program 19, based on the information regarding how the second acquisition device 12 is currently parameterized and thus the currently set second measurement range M2 is known and it is therefore known in which range the second measured value AI2 must lie, a plausibility check is performed between the first measured value AI1 and the second measured value AI2. For this purpose, the first functional component 21 comprises on its input side an input "analogin1" for the first measured value AI1 and an input "analogin2" for the second measured value AI2. As an output value, the first functional component 21 provides an error-protected measured value A0 "analogOut". The plausibility check is thus performed in the first functional component 21 and the re-parameterization of the second acquisition device 12 is performed with the second functional component 22. The first and second measured values AI1, AI2 are passed as input values to the first functional component 21 and, as the output value, the second functional component 21 provides the error-protected measured value A0. The second functional component 21 additionally generates a start signal S for the re-parameterization. The start signal S is fed as an input signal to the second functional component 22, which then initiates the re-parameterization and, following completed re-parameterization, provides a feedback signal CD to the second functional component 22. The feedback signal CD is itself fed as an input to the first functional component 21 "changeDone".

Figure 3:
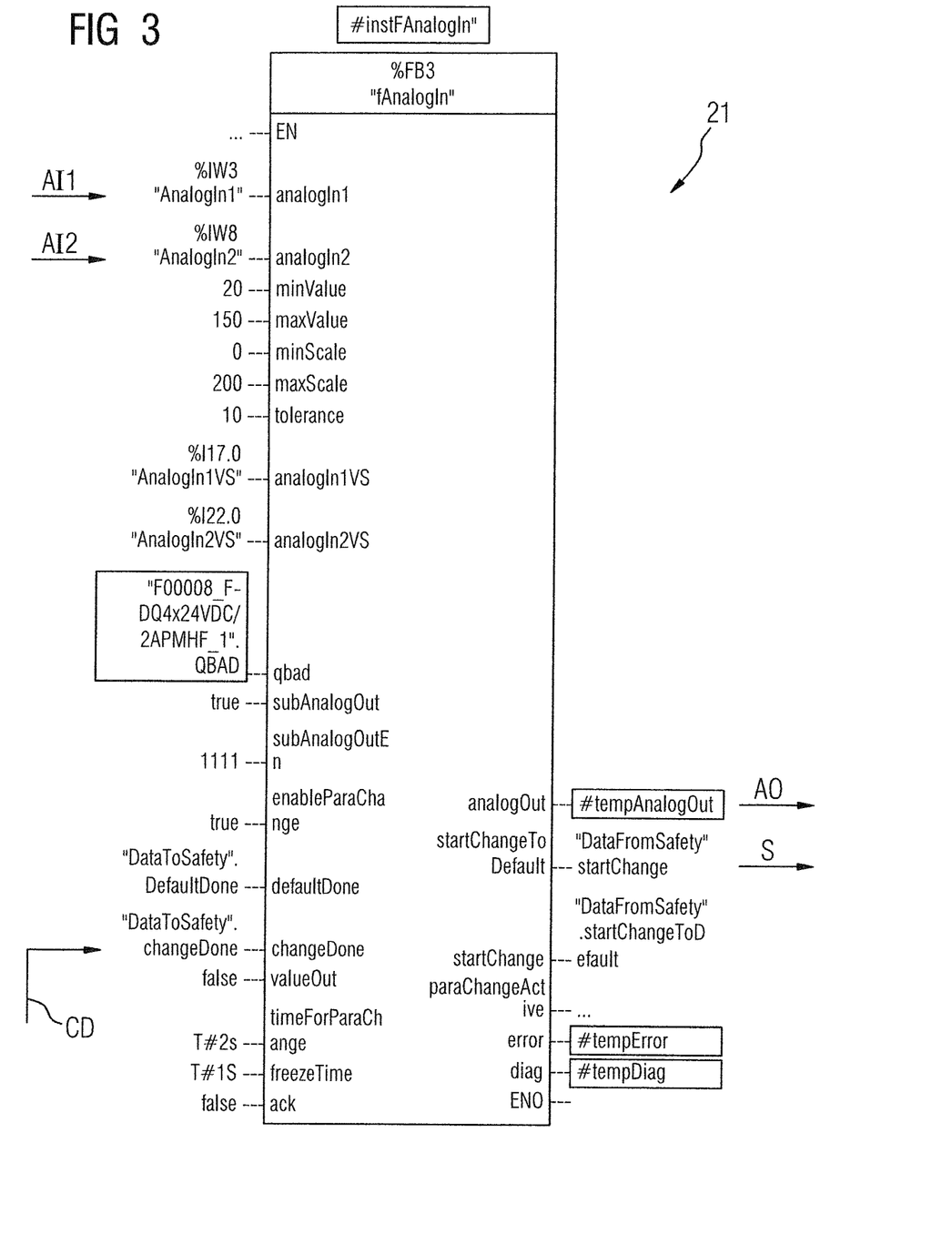
FIG. 3 is a first functional component with inputs and outputs in accordance with the invention.

FIG. 3 shows the first functional component 21 in detail with all its inputs and outputs. Essentially, the first measured value AI1 and the second measured value AI2 are fed to the corresponding inputs "Analog in 1" and "Analog in 2". The first functional component 21 provides a safe measured value A0 "Analog out".

All the parameters of the second functional component are defined below:

| Parameter | Data type | In/out | Explanation |
|---|---|---|---|
| analogIn1 | INT | IN | Analog value S-AI1 (value with fixed 0-20 mA parameterization) Default value: 0 |
| analogIn2 | INT | IN | Analog value S-AI2 (value with alternating parameterization 0-20 mA and 4-20 mA) Default value: 0 |
| tolerance | DINT | IN | The maximum permissible tolerance between the two analog values can be input here. Due to measuring inaccuracies and rounding, this should not be kept too low. The tolerance is given in the dimensions of the measured dimension of the process value. Default value: 10 |
| minValue | DINT | IN | Here, the user can input the lower limit value of the process value. The unit of the minimum value corresponds to that of the process value Default value: 20 |
| maxValue | DINT | IN | Here, the user can input the upper limit value of the process value. The unit of the maximum value corresponds to that of the process value Default value: 150 |

-continued

| Parameter | Data type | In/out | Explanation |
|---|---|---|---|
| minScale | DINT | IN | Lower limit value to which the measured variable must be scaled.<br>If, for example, the measurement is carried out for a measurement range of 0 . . . 300° C., a "0" must be entered here.<br>Default value: 0 |
| maxScale | DINT | IN | Upper limit value to which the measured variable must be scaled.<br>If, for example, the measurement is carried out for a measurement range of 0 . . . 300° C., a "300" must be entered here.<br>Default value: 200 |
| analogIn1VS | BOOL | IN | Value status of the first standard analog module.<br>The value status is merely additional information and is not absolutely necessary for the safety of the analog values.<br>However, it provides a simple additional diagnosis.<br>Default value: false |
| analogIn2VS | BOOL | IN | See AI1VS→ Value status analog module 2<br>Default value: false |
| qbad | BOOL | IN | Switching the QBAD signal of an F module which must be plugged into the same ET 200SP station as both the analog modules. The F module must be plugged after the two analog modules.<br>Default value: true |
| subAnalogOutEn | BOOL | IN | Specification of whether in the case of an error, replacement values or invalid values are output.<br>0: invalid values output<br>1: the replacement values specified for subAnalogOut are output<br>Default value: false |
| subAnalogOut | DINT | IN | Replacement value that is output in case of an error and when subAnalogOutEn is activated.<br>Default value: 0 |
| valueOut | BOOL | IN | Specification of whether the larger or the smaller analog value is available at the outlet "Out". If the two process values are identical, AI1 is provided in each case.<br>0: The smaller process value is provided.<br>1: The larger process value is provided.<br>Default value: false |
| freezeTime | TIME | IN | Time for the freeze watchdog. Depending upon the parameterized time, one or both analog values may remain unaltered.<br>If the values do not change in the defined time window, an error bit is set. Default value: 1 s |
| ack | BOOL | IN | Acknowledgement input:<br>In order to initiate the restarting of the component following an error, a manual acknowledgement is necessary.<br>Default value: false |
| enableParaChange | BOOL | IN | On use of a plurality of FB "fAnalogIn", care must be taken that only one component is currently in the re-parameterization process in each case. A faulty addressing is otherwise not reliably discovered.<br>With the entry, the process can be briefly bypassed.<br>Default value: true |
| changeDone | BOOL | IN | Information from the standard user program whether the parameter data set for the re-parameterization has been written to a measurement range of 0 . . . 20 mA.<br>Default value: false |
| defaultDone | BOOL | IN | Information from the standard user program whether the parameter data set for the re-parameterization has been written to a measurement range of 4 . . . 20 mA.<br>Default value: false |

-continued

| Parameter | Data type | In/out | Explanation |
|---|---|---|---|
| timeForParaChange | TIME | IN | Allowed time for parameter change. Default value: 2 s |
| analogOut | DINT | OUT | In an error-free case, the plausibility tested analog value is provided here. In the case of an error, either an invalid analog value (denoted by error = true) or a replacement value is provided. Default value: 0 |
| diag | WORD | OUT | Diagnosis output. The diagnosis word is composed of different error bits and gives detailed information regarding the error cause. The composition of the diagnosis word is explained in section 2.5. Default value: 16#0000 |
| error | BOOL | OUT | Global error bit. Set as soon as an error occurs internally. Default value: true |
| startChangeToDefault | BOOL | OUT | Start flag for the beginning of the re-parameterization to default values. The bit must be passed to the standard user program and starts a WRREC request. Default value: false |
| startChange | BOOL | OUT | Start flag for the beginning of the re-parameterization. The bit must also be transferred by means of a couple DB to the standard user program in order to trigger the WRREC request there. Default value: false |
| paraChangeActive | BOOL | OUT | On use of a plurality of FB "fAnalogIn", a corresponding handling must be generated which guarantees that only one re-parameterization takes place in each case. The bit indicates whether a re-parameterizing cycle is currently taking place in the selected component or not. Default value: false |
| EN | BOOL | IN | Must not be switched - system-related input in the safety program with no function. |
| ENO | BOOL | OUT | Must not be switched - system-related outlet in the safety program with no function. |

Figure 4:
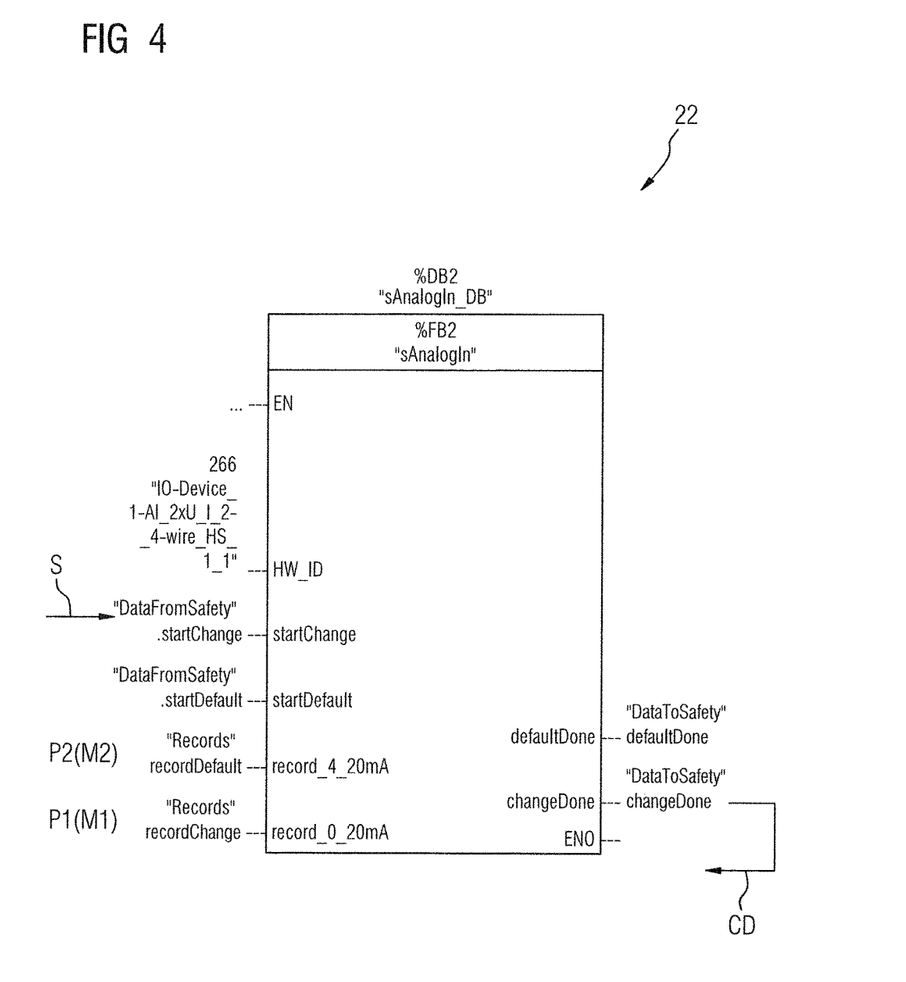
FIG. 4 is a second functional component with inputs and outputs in accordance with the invention.

FIG. 4 shows the second functional component 22 that performs the re-parameterization of the second acquisition device 12. For a first parameter set P1 and a second parameter set P2 (see also FIG. 2), where the first parameter set P1 (M1) is present as a data record 0 . . . 20 mA and the second parameter set P2 (M2) is present as a data record 4 . . . 20 mA. These two parameter sets P1, P2 are used by the second functional component 22 as input variables for the re-parameterization of the second acquisition device 12.

The start signal S functions as a trigger for the second functional component 22. Each time the signal S is applied, with the aid of the second functional component 22, the respectively valid parameter set in the second acquisition device 12 is re-parameterized to the other alternatingly. Once re-parameterization has been accomplished, the second functional component 22 generates a feedback signal CD ("changeDone") which is fed back to the first functional component 21. With the feedback signal CD, confirmation is made to the first functional component 21 for its plausibility test that the second acquisition device 12 has the now present valid parameterization.

All the parameters of the second functional component are defined below.

| Parameter | Data type | In/out | Explanation |
|---|---|---|---|
| HW_ID | HW_ANY | IN | Enter here the hardware ID of the module that is provided for the re-parameterization. In the present case, S-AI2. |
| startChange | BOOL | IN | Start bit from the safety program. Initiates the process of re-parameterization. |
| startDefault | BOOL | IN | Start bit from the safety program. Initiates the process of back-parameterization back to the original state. |
| record_4_20mA | typeRecord . . . | InOut | Default data set |
| record_0_20mA | typeRecord . . . | InOut | Re-parameterization data set |
| defaultDone | BOOL | OUT | Bit to the safety program. Signals the completion of the back-parameterization |
| changeDone | BOOL | OUT | Bit to the safety program. Signals the completion of the re-parameterization. |
| EN/ENO | | | Must not be connected. |

Figure 5:
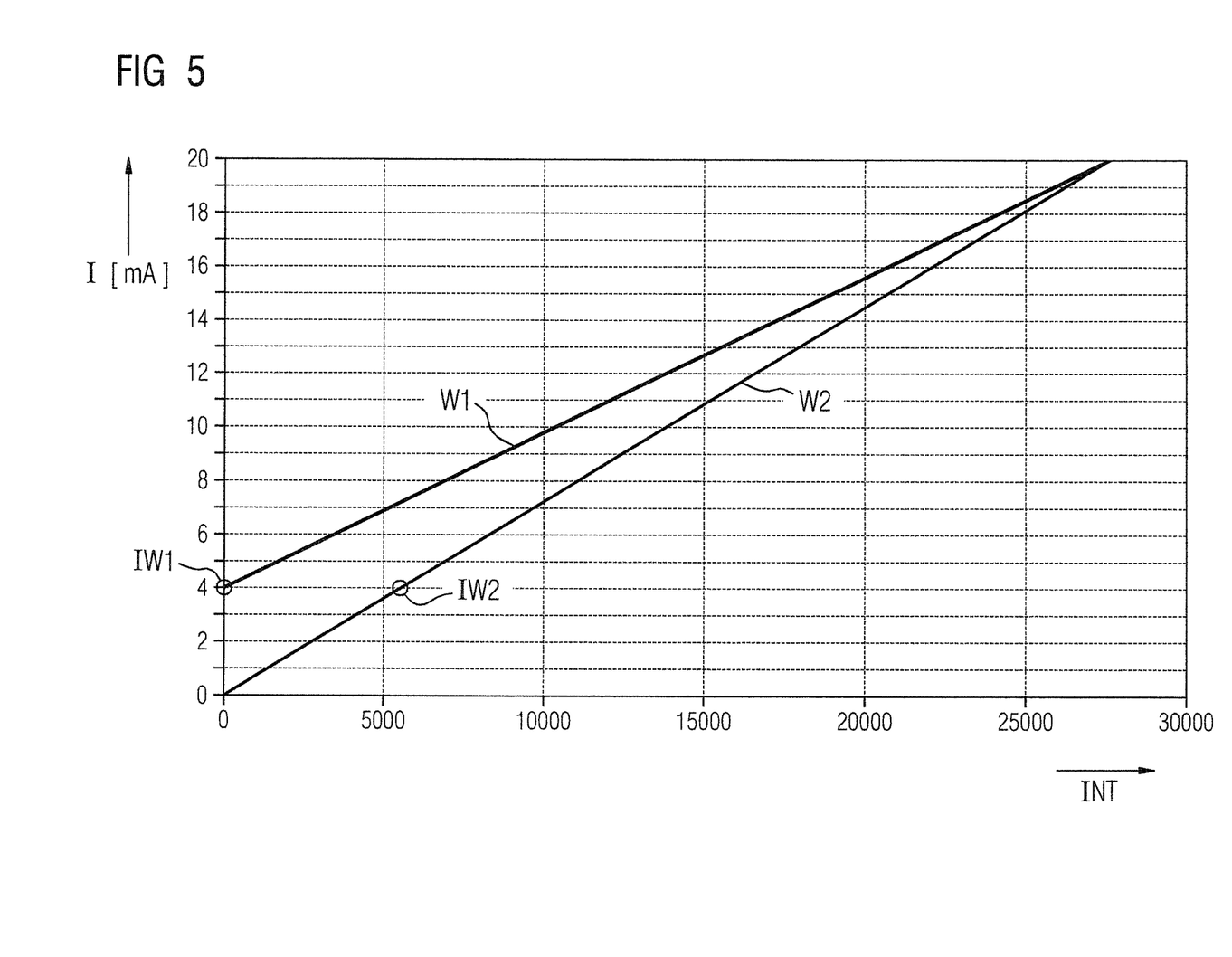
FIG. 5 is a graphical representation of integer values provided at different parameterizations.

FIG. 5 shows a graphical representation of a first converter curve W1 and a second converter curve W2. The first and second converter curves W1, W2 are accordingly assigned to the first acquisition means 11 and the second acquisition device 12. The first converter curve W1 is shown for an analog-digital converter in the case of a converter that is configured for a parameterization from 4 to 20 mA and the second converter curve W2 is shown for a parameterization from 0 to 20 mA. The X-axis shows values in the milli-ampere range and the Y-axis shows the integer values IW1, IW2 provided by the analog-digital converters. This graphical representation of the curve shape is present in the safety program 19 and in the first functional component 21 as an expected item of knowledge. Due to the different parameterizing of the first and second acquisition devices 11, 12, it is now possible via the first value, e.g., the first integer value IW1, to provide an expectation of the second value, e.g., second integer value IW2.

For example, for a measurement of a current of 4 mA for the first integer value IW1 and a parameterization of 4 to 20 mA, the value 0 is generated. Subsequently based thereon that it is known in the first functional component 21 how the second acquisition means 12 must behave, an expectation can now be set for the second integer value IW2. The second integer value IW2 must then be situated in the region of approximately 5530, otherwise an error has occurred which is revealed by a cross-comparison.

The following diagnoses and methods are implemented in the functional components:

Cross-Comparison

The redundant reading-in of the two analog values enables the two values in the safety program to be checked as to whether they are identical. With this, different error models can be discovered and overcome.

If the two values are too far apart (settable via the input parameter "tolerance") or if they even differ entirely, an error bit is set and the corresponding error reaction is initiated.

Monitoring for Stuck-At Errors

The safety program stores the current value S-AI1$n$ in each F-cycle and compares it in the next cycle with the current value S-AI1($n$+1) there. The same is performed with the analog value S-AI2.

Given that the analog values S-AI1$n$ and S-AI1($n$+1) are identical within two cycles, a timer is started. Within this time (the "freeze time"), the old values must differ from the current values. If this is not the case, the corresponding error action is initiated.

Diverse Parameterization of the Assemblies

Based on the redundant structure, it is possible to parameterize the two analog assemblies differently from one another. There are two different possibilities for amending the parameters of the analog assemblies.

Amending the Parameters in the Hardware Configuration

When the hardware configuration is created, different properties can be assigned to the assembly. It is possible, inter alia, to switch diagnoses on or off, to set smoothing factors or to define the measurement type.

Amendment of the Parameters for Run Time (CiR=Configuration in Run)

The second possibility lies in re-parameterizing the assemblies at run time. For this, the component "WRREC" is used that writes the corresponding data set to the assembly at run time.

In the present usage example, both methods of re-parameterization are used.

It is therefore possible, via the first value, to place an expectation on the second value. For a measurement of a current of 4 mA on assembly 1, an INT-value of 0 is generated. On the basis that it is known in the safety program how the assembly 2 must now behave, an expectation can be set for the value. A value of approximately 5530 should arrive because, otherwise, an error has occurred that is revealed by the cross-comparison.

Limit Value Monitoring

With the aid of a minimum and maximum limit, you can very easily define process limits at which, if exceeded, a dangerous state can be reached. For this purpose, the parameterized limit values can be compared with the current process values and on undershooting or overshooting, a corresponding bit is set in the diagnosis word and the error bit is set.

QBAD Monitoring

The QBAD signal is to be found in the peripheral data component of the F-assembly used and to be duly connected to the component. Through the use of an F-assembly and the QBAD signal, PROFIsafe measures that bring substantial advantages with them are also used.

The F-assembly passes on its process data in a PROFIsafe packet via the backplane bus to the interface module of the ET200SP. If systematic errors, such as overvoltages, were to distort data at the backplane bus, then the PROFIsafe packet would also be distorted. On the basis of the system-related mechanisms, such distortions are reliably discovered by the F-CPU. Errors at the backplane bus can thus be overcome with the aid of the F-assembly.

Cyclic Re-Parameterization

The cyclic re-parameterization of the second assembly is a substantial constituent of the safety concept. Herein, in a pre-set cycle, one of the two assemblies is re-parameterized.

The frequency of this measure can be determined in accordance with DIN EN 61508-2, item 7.4.4.1.5.

It is explained here that the diagnosis can only be attributed to the proportion of definite drop-outs if the total of the diagnosis test interval and the repair duration is smaller than the assumed MTTR. From this, the following can be concluded. According to DIN EN 61508-4, the MTTR ("mean time to restoration") is given by the following points: (i) duration until recognition of a drop-out, (ii) duration until beginning of the restoration, (iii) actual repair duration, and (iv) duration until the component is put into operation.

The MTTR is set, in this case, to 8 hours. This means that within this 8 hours, the error must be recognized and remedied. A repair of the analog assemblies is not possible without difficulty due to their complexity, so that a replacement assembly must be utilized.

The actual repair duration is thus very low, since the exchanging of the assembly typically only takes a few minutes.

Since under DIN EN 61508-2, point 7.4.4.1.5, the following applies:

Diagnosis test interval+repair time <MTTR

MTTR=8 hours

Repair time: <<1 hour (exchange of the assembly)

For the diagnosis test interval, theoretically a minimum of 7 hours is available. Based on a conservative approach, the interval of this diagnosis is set at 15 min.

Coded Processing

All the safety-relevant tasks are handled in the safety program of the CPU. The control units used are certified and can achieve SIL 3 or PL e. The certificates can be viewed online.

Value Status of the S-AI

The value status of the assembly should be evaluated and connected as described.

The following must additionally be observed and is not contained in the component:

Run-Through of the Whole Measurement Range

In order to be able to preclude various error models, it is necessary to check within a defined interval whether the AD converter of the analog components is still functioning correctly.

Setting of the test interval is the responsibility of the user. He has to decide according to various criteria how often the test is to be performed. How often is the measurement range run through in regular operation? How high are the MTBF values of the assemblies/sensors used? Can Stuck-At errors be precluded (regular assembly exchange, or similar)?

A period of one year is set as the lower limit value. Thus, the entire measurement range must be run through at least 1× per year and the upper and lower limits must necessarily be tested.

In the context of this measure, at the same time, the assemblies must be investigated for a possibly existing drift. For this purpose, it is possible, for example, to verify the measured value via a real known value and to perform a (then possibly required) calibration of the assembly.

Figure 6:
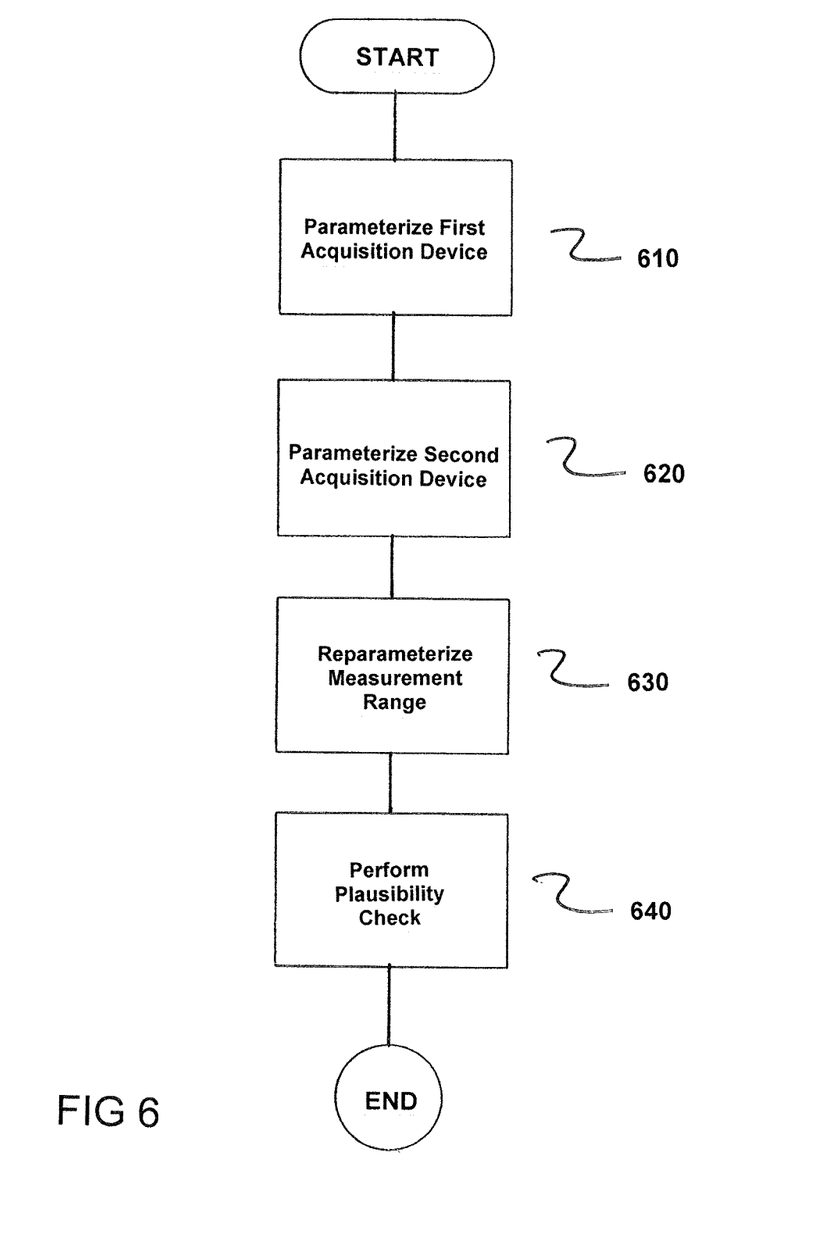
FIG. 6 is a flowchart of the method in accordance with the invention.

FIG. 6 is a flowchart of the method for error-protected acquisition of a measured value AO in a control unit 10, where the measured value AO is firstly acquired with a first acquisition device 11 and secondly with a second acquisition device 12 such that a first measured value AI1 and a second measured value AI2 are made available, where during a comparison in a safety program 19 executing in the control unit 10, the first and the second measured value AI1, AI2 are compared with one another for a deviation from one another and upon reaching or exceeding a pre-determined maximum deviation min V, max V, an error being identified.

The method comprises parameterizing the first acquisition device 11 for a first measurement range M1 to be set, as indicated in step 610.

Next, parameterizing the second acquisition device 12 for a second measurement range M2 to be set is parameterized, as indicated in step 620.

Next, the measurement range M2 for the second acquisition device 12 in the safety program 19, based on information regarding how the second acquisition device 12 is currently parameterized, is re-parameterized alternatingly, aided by the safety program 19, such that a currently set second measurement range 12 is known and it is therefore known in which range the second measured value AI2 must lie, as indicated step 630.

Next, a plausibility check between the first measured value AI1 and the second measured value AI2 is performed, as indicated in step 640. In accordance with the method of the invention, if the plausibility check result is negative, an error is also identified.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for error-protected acquisition of a measured value in a control unit, the measured value being firstly acquired with a first acquisition device and secondly with a second acquisition device such that a first measured value and a second measured value are made available, during a comparison in a safety program executing in the control unit, the first and the second measured value being compared with one another for a deviation from one another and upon reaching or exceeding a pre-determined maximum deviation, an error being identified, the method comprising:

parameterizing the first acquisition device for a first measurement range to be set;

parameterizing the second acquisition device for a second measurement range to be set;

re-parameterizing alternatingly, aided by the safety program, the measurement range for the second acquisition device in the safety program, based on information regarding how the second acquisition device is currently parameterized, such that a currently set second measurement range is known and it is therefore known in which range the second measured value must lie; and performing a plausibility check between the first measured value and the second measured value;

wherein if the plausibility check result is negative, an error is also identified.

2. The method as claimed in claim 1, wherein analog-digital converters are utilized in the first and second acquisition device and an analog-digital converter in the first acquisition device provides a first integer value for the first measured value and an analog-digital converter in the second acquisition device provides a second integer value for the second measured value, to which the plausibility check is applied.

3. The method as claimed in claim 1, wherein the plausibility check is performed in a first functional component within the safety program of the control unit and the re-parameterization of the second acquisition device is performed in a second functional component;

wherein the first and second measured values are transferred to the first functional component as input values and, as output values, firstly the error-protected measured value is provided and secondly a start signal is provided for the re-parameterization; and wherein the start signal is provided as an input value to the second functional component, which thereupon initiates the re-parameterization and following successful re-parameterization, the second functional component provides a feedback signal, which signal is then switched to the first functional component as an input value.

4. The method as claimed in claim 2, wherein the plausibility check is performed in a first functional component within the safety program of the control unit and the re-parameterization of the second acquisition device is performed in a second functional component;

wherein the first and second measured values are transferred to the first functional component as input values and, as output values, firstly the error-protected measured value is provided and secondly a start signal is provided for the re-parameterization; and wherein the start signal is provided as an input value to the second functional component, which thereupon initiates the re-parameterization and following successful re-parameterization, the second functional component provides a feedback signal, which signal is then switched to the first functional component as an input value.

5. The method as claimed in claim 3, wherein in the first functional component, it is additionally monitored whether at least one measured value changes in a pre-determined time window and, if no change occurs, an error is also identified.

6. The method as claimed in claim 1, wherein the first and second acquisition devices are each configured to acquire a current in the range from 0 to 20 mA or in the range from 4 to 20 mA.

7. An automation system configured for error-protected acquisition of a measured value, comprising:
- a first acquisition device configured to acquire a first measured value;
- a second acquisition device configured to acquire a second measured value; and
- a control unit which executes a safety program provided with the safety unit, the a safety program comparing the first and the second measured values with one another for a deviation from one another and upon reaching or exceeding a pre-determined maximum deviation, identifying an error;
- wherein the first acquisition device is set for a first measurement range to be set and the second acquisition device is alternatingly re-parameterizable aided by the safety program in a second measurement range to be set;
- wherein the safety program has knowledge regarding a currently set second measurement range;
- wherein the safety program is further configured to perform a plausibility check between the first measured value and the second measured value; and
- wherein the safety program is further configured to perform the plausibility check aid by knowledge of a value range to be expected within which the second measured value must lie and is further configured, in an event of a negative plausibility check result, to also signal an error.

8. The automation system as claimed in claim 7, wherein the first and second acquisition device each include an analog-digital converter and an analog-digital converter in the first acquisition device provides a first integer value for the first measurement range and an analog-digital converter in the second acquisition device provides a second integer value for the second measurement range, and the safety program is configured to perform the plausibility check based on the first and second integer values.

9. The automation system as claimed in claim 7, wherein the safety program of the control unit comprises a first functional component which is configured to perform the plausibility check and a second functional component which is configured to perform the re-parameterization of the second acquisition device.

10. The automation system as claimed in claim 8, wherein the safety program of the control unit comprises a first functional component which is configured to perform the plausibility check and a second functional component which is configured to perform the re-parameterization of the second acquisition device.

11. The automation system as claimed claim 7, wherein the control unit comprises an industrial automation control system configured for functional safety; and wherein the first acquisition device and the second acquisition device are respectively configured as an industrial analog assembly.

12. The automation system as claimed claim 8, wherein the control unit comprises an industrial automation control system configured for functional safety; and wherein the first acquisition device and the second acquisition device are respectively configured as an industrial analog assembly.

13. The automation system as claimed claim 9, wherein the control unit comprises an industrial automation control system configured for functional safety; and wherein the first acquisition device and the second acquisition device are respectively configured as an industrial analog assembly.

14. The automation system as claimed in claim 11, further comprises an industrial assembly configured for functional safety and connected to a backplane bus to which the industrial analog assemblies are also connected such that monitoring of the backplane bus is realized; and wherein the industrial assembly configured for functional safety is further configured to generate a quality signal which permits conclusions to be drawn regarding errors at the backplane bus.

* * * * *